(12) United States Patent
Raab et al.

(10) Patent No.: US 11,000,917 B2
(45) Date of Patent: May 11, 2021

(54) LASER MARKING SYSTEM AND METHOD FOR LASER MARKING A WORKPIECE

(71) Applicant: Thorlabs Measurement Systems Inc., Blairstown, NJ (US)

(72) Inventors: Simon Raab, Santa Barbara, CA (US); Mark S. Longmuir, Tamworth, NH (US)

(73) Assignee: Thorlabs Measurement Systems Inc., Blairstown, NJ (US)

( * ) Notice: Subject to any disclaimer, the term of this patent is extended or adjusted under 35 U.S.C. 154(b) by 0 days.

(21) Appl. No.: 16/510,046

(22) Filed: Jul. 12, 2019

(65) Prior Publication Data

US 2021/0008663 A1    Jan. 14, 2021

(51) Int. Cl.
| | |
|---|---|
| *B23K 26/06* | (2014.01) |
| *B23K 26/18* | (2006.01) |
| *B23K 26/03* | (2006.01) |
| *B23K 26/082* | (2014.01) |
| *B41M 5/26* | (2006.01) |
| *B41M 5/00* | (2006.01) |
| *B23K 101/00* | (2006.01) |

(52) U.S. Cl.
CPC ........ *B23K 26/0604* (2013.01); *B23K 26/032* (2013.01); *B23K 26/0643* (2013.01); *B23K 26/082* (2015.10); *B23K 26/18* (2013.01); *B41M 5/00* (2013.01); *B41M 5/26* (2013.01); *B41M 5/262* (2013.01); *B41M 5/267* (2013.01); *B23K 2101/007* (2018.08)

(58) Field of Classification Search
None
See application file for complete search history.

(56) References Cited

U.S. PATENT DOCUMENTS

| | | | |
|---|---|---|---|
| 6,252,181 B1 | 6/2001 | Fallas et al. | |
| 9,632,219 B2 | 4/2017 | Evans et al. | |
| 9,690,017 B2 | 6/2017 | Tohme et al. | |
| 2007/0173795 A1* | 7/2007 | Frey | A61F 9/008 606/5 |
| 2008/0035616 A1 | 2/2008 | Muller et al. | |

(Continued)

OTHER PUBLICATIONS

Wikipedia entry "Camera", printed on Oct. 2, 2020 (Year: 2020).*

(Continued)

*Primary Examiner* — Jiong-Ping Lu
(74) *Attorney, Agent, or Firm* — Myers Wolin, LLC (57) ABSTRACT

A laser marking system for marking a predetermined pattern on a workpiece may include a first light source structured to emit first light at a first wavelength; a second light source structured to emit second light at a second wavelength different from the first wavelength and selected to mark a marking surface of the workpiece; beam shaping optics structured to adjust a focal length of the second light; beam steering optics structured to aim the first laser light and the second laser light; a controller configured to control the first light source to emit the first light at the marking surface of the workpiece and control the beam steering optics to aim the second light so as to mark the marking surface of the workpiece and create the first predetermined pattern; and a camera structured to detect first light reflected from the marking surface and record an image.

7 Claims, 8 Drawing Sheets

(56) References Cited

U.S. PATENT DOCUMENTS

2014/0375794 A1* 12/2014 Singh ..................... G01B 11/14
 348/95
2017/0014945 A1    1/2017 Fraser et al.

OTHER PUBLICATIONS

T. Olmstead et al., System for Determining Photodistruptive Laser Placement in Lenses, Investigative Ophthalmology & Visual Science, May 2007, vol. 48, p. 3835. (Year: 2007).*

* cited by examiner

FIG. 8

LASER MARKING SYSTEM AND METHOD FOR LASER MARKING A WORKPIECE

BACKGROUND

The subject matter disclosed herein relates to a laser marking system and a method for laser marking.

Laser marking relates to the user of laser light to remove material from a surface of a workpiece to create an etching, or chemically/molecularly alter the material of a workpiece to change the color of the surface. Laser marking is advantageous in that it can be performed on a variety of materials and does not require physical contact to create the mark.

However, existing laser marking systems require additional surface profiling equipment to locate the work surface in 3D space and either using integrated vision systems or moving the workpiece from the laser marking system to a separate system in order to verify accuracy and quality of the marking. This may introduce errors in the verification process, as there may be minor variations in the alignment and/or coordinate systems between the laser marking system and the surface recognition or verification system. Additionally, using a separate profiling and verification system significantly increases the processing time and cost. Additionally, laser marking systems may produce lower quality markings on a varying workpiece surface due to focal distance of the laser light being used for the marking. Additionally, separate verification systems may be required depending on whether the laser marking is physically altering a surface of the workpiece or the laser marking is inducing a change in color in the surface of the workpiece. Additionally, the ability to detect the workpiece location and focal distance without the need to load 3D CAD file models into the focusing correction system allows rapid setup and laser marking of irregular or non-standard shaped parts in a low volume, high mix laser marking environment.

Accordingly, while existing laser marking systems may be suitable for their intended purpose, it may be desirable to have a system which can streamline the setup and marking process and eliminate verification errors by detecting surfaces, marking, and verifying on the same system. Additionally, it may be desirable to have a system which can accurately produce high quality markings on a varying surface. Additionally it may be desirable to have a laser marking and verification system that can verify both physical laser marking and color-change laser marking without requiring separate verification systems.

BRIEF DESCRIPTION

An embodiment of a laser marking system for marking a predetermined pattern on a workpiece may include a first light source structured to emit first light at a first wavelength. The laser marking system may further include a second light source structured to emit second light at a second wavelength different from the first wavelength and selected to mark a marking surface of the workpiece. The laser marking system may further include beam shaping optics structured to adjust a focal length of the second light. The laser marking system may further include beam steering optics structured to aim the first laser light and the second laser light. The laser marking system may further include a controller configured to control the first light source to emit the first light at the marking surface of the workpiece; and control the beam steering optics to aim the second light so as to mark the marking surface of the workpiece and create the first predetermined pattern. The laser marking system may further include a camera structured to detect first light reflected from the marking surface of the workpiece and record an image.

An embodiment of a method for making a predetermined pattern on a workpiece may include forming the predetermined pattern on a marking surface of the workpiece by emitting a marking laser light at the marking surface, the marking laser light having a wavelength selected to mark the marking surface. The method may further include emitting a verifying light at the marking surface of the workpiece, the verifying light having a second wavelength different from the first wavelength. The method may further include detecting, with a camera, verifying light reflected from the marking surface of the workpiece and recording an image.

An embodiment of a method for making a predetermined pattern on a workpiece may include providing a system comprising a controller, a first laser light source structured to emit visible first laser light, a second laser light source structured to emit second laser light having a wavelength and power selected to mark a marking surface of the workpiece, beam shaping optics, beam steering optics, and a camera. The method may further include emitting the first laser light at the marking surface and controlling, with the controller, the beam steering optics to illuminate the marking surface. The method may further include collecting, with the camera, first laser light reflected from the workpiece. The method may further include calculating coordinates of the marking surface based on position data of the controller and the reflected first laser light collected by the camera. The method may further include generating a three-dimensional (3D) optical correction file based on the coordinates of the marking surface. The method may further include emitting the second laser light at the marking surface to generate the predetermined pattern. The emitting the second laser light may include controlling, with the controller, beam steering optics to aim the second laser light across the marking surface; and controlling, with the controller, the beam shaping optics based on the optical correction file to control a focal length of the second laser light as the predetermined pattern is formed.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
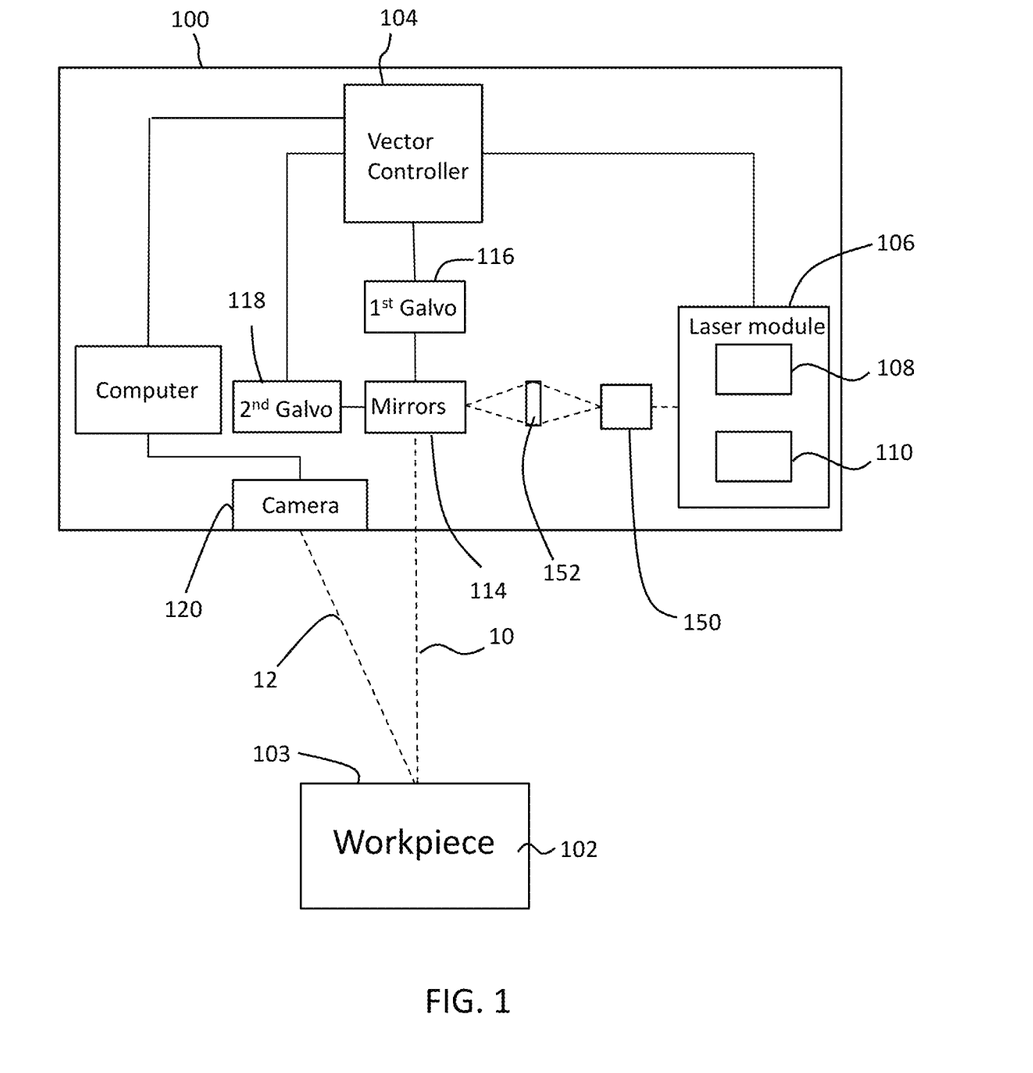
FIG. 1 is a schematic view of a laser marking system according to an embodiment.
Figure 2:
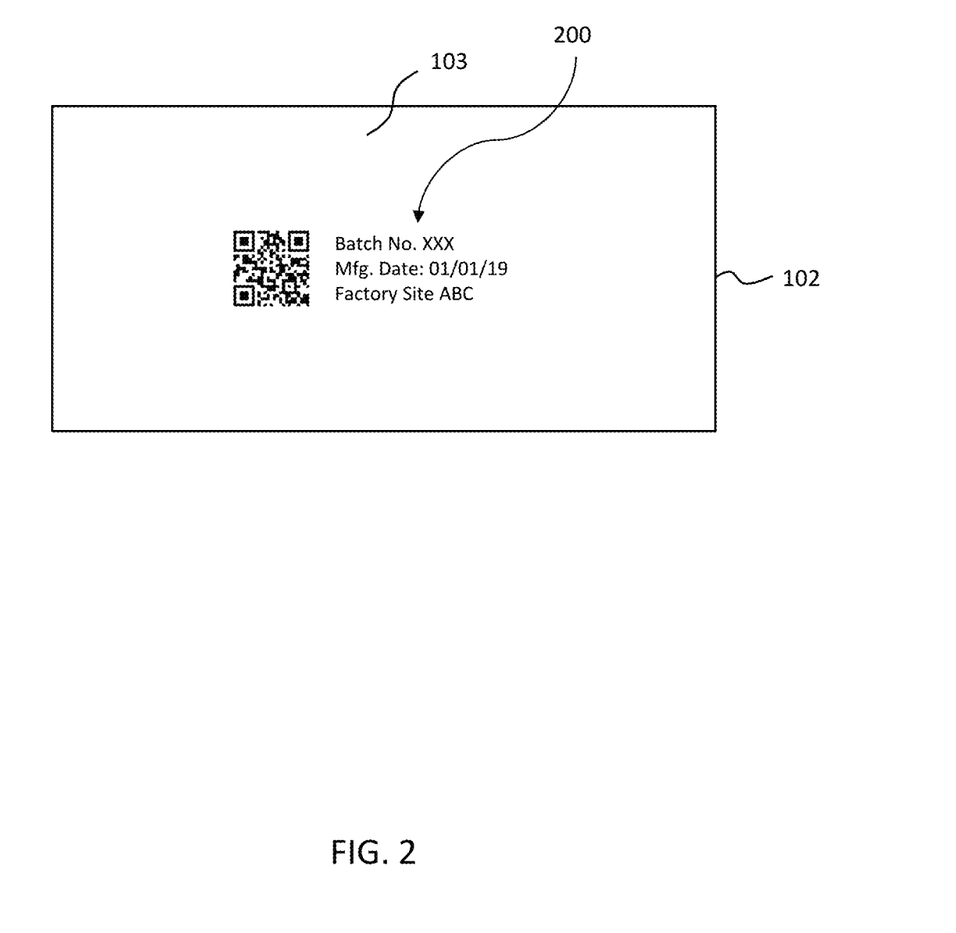
FIG. 2 is a planar view of a marking surface of a workpiece according to an embodiment.

FIG. 1 shows an embodiment of a one-step laser marking system 100 for laser marking a workpiece 102 to create a predetermined pattern on a marking surface 103 of the workpiece 102. FIG. 2 shows a planar view of an exemplary embodiment of marking surface 103 having a predetermined pattern 200. As seen in FIG. 2, the predetermined pattern may include information such as a barcode, QR code, or letter or number strings, logos, decorative elements, or combinations thereof.

In an exemplary embodiment shown in FIG. 1, system 100 may include vector controller 104, a laser light module 106, beam shaping optics including dynamic focus linear lens translator 150 and objective lens 152, a beam steering mechanism including mirrors 114 controlled by a first galvanometer 116 for x-axis scanning and second galvanometer 118 for y-axis scanning, one or more cameras 120, and computer 160 including a processor. Vector controller 104 may be operably connected to and structured to control laser light module 106, dynamic focus linear lens translator 150, objective lens 152, first galvanometer 116, and second galvanometer 118. Computer 160 may be operably connected to camera 120 and structured to decode the output of camera 120. Computer 160 may further be operably connected to vector controller 104.

In an exemplary embodiment laser light module 106 emits laser light 10, which may be shaped and focused by dynamic focus linear lens translator 150 and objective lens 152 and then steered by mirror 114 to be directed to workpiece 102. Laser light module 106 may include a first laser light source 108 structured to emit first laser light which is visible spectrum light operating at low power. First laser light may be used for aligning workpiece 102 and visually confirming the location to be marked. In an exemplary embodiment, the first laser light may be 632 nm light. However, it will be understood that the first laser light is not limited to this wavelength and that other wavelengths such as 532 nm may be used.

Laser light module 106 may include a second laser light source 110 structured to emit second laser light at a second wavelength selected to mark a surface of the workpiece. Compared to first laser light source 108, second laser light source operates at a higher power used to transform the material. The power range of second laser light source may be in the range of 20 W to 2 kW. For example, second laser light source 110 may be structured to emit light having a wavelength in the range of 355 nm to 10.6 μm. It will be understood that may types of laser markings methods may be used, and the wavelength and power of second laser light source 110 may vary depending on the material of workpiece 102 and the type of marking being performed. In one embodiment, for example, second laser light source 110 may emit light at a wavelength and power that physically removes material from workpiece 102 to create the predetermined pattern. In another embodiment, second later light source 100 may emit light at a wavelength and power that creates a chemical reaction to change a color on a surface of workpiece 102.

Figure 3:
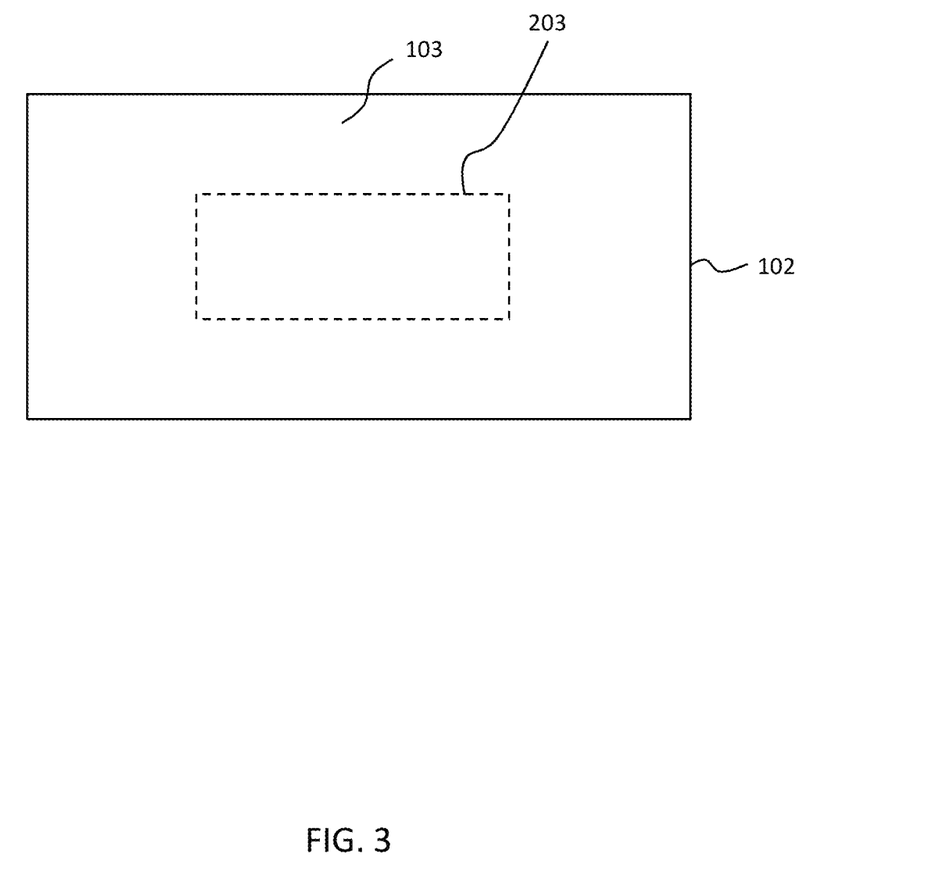
FIG. 3 is a planar view of a marking surface of a workpiece according to an embodiment.

First laser light source 108 may be used as a pointer or guide to verify a positioning of the predetermined pattern prior to formation of the predetermined pattern. For example, the first laser light may be shaped and aimed to indicate a center, edge, corner, or other portion of the predetermined pattern in visible light. FIG. 3 shows an exemplary embodiment in which first laser light source 108 is controlled to trace an aiming pattern 203 on marking surface 103. Aiming pattern 203 may show an outer periphery of the predetermined pattern, so that the workpiece can be adjusted so that the predetermined pattern is formed in the desired location.

In an exemplary embodiment, dynamic focus linear lens translator 150 and objective lens 152 focus laser light 10 at an appropriate depth for marking workpiece 102. Dynamic focus linear lens translator 150 may be structured to dynamically change the focal length very quickly so that the laser marking occurs at the proper depth as the laser scans over the workpiece 102.

In an exemplary embodiment, mirror 114 may be structured to direct laser light 10 toward the marking surface 103 of workpiece 102. An aiming direction of mirror 114 may be controlled by first galvanometer 116 and second galvanometer 118. First galvanometer 116 and second galvanometer 118 may be operably connected to and controlled by controller 104.

Vector controller 104 and laser light module 106 may be configured such that vector controller 104 can independently control operation of first laser light source 108 and second laser light source 110. It will also be understood that first laser light source 108 and second laser light source 110 may be separately provided instead of being integrated together in a single laser light module 106.

Vector controller 104 may be structured to control first galvanometer 116 and second galvanometer 118 to aim the second laser light via mirror 114 to create the predetermined pattern on marking surface 103. For example, vector controller 104 may be provided with a previously stored image or coordinates of the predetermined pattern, and may control an on/off state of second laser light source 110 and first galvanometer 116 and second galvanometer 118 to recreate the predetermined pattern on marking surface 103.

Vector controller 104 may be further structured to control first laser light source 108, first galvanometer 116, and second galvanometer 118 to aim the first laser light over the area where the predetermined pattern was formed on the marking surface 103. Camera 120 may be sensitive to the wavelength of the first laser light and be controlled to detect first laser light reflected from the marking surface 103 after the predetermined pattern is formed. Computer 160 may be structured to decode the output of camera 120, thereby storing an image of marking surface 103. The image recorded by camera 120 may be compared to the previously stored image or coordinates of the predetermined system to verify accurate creation of the predetermined pattern.

Figure 4:
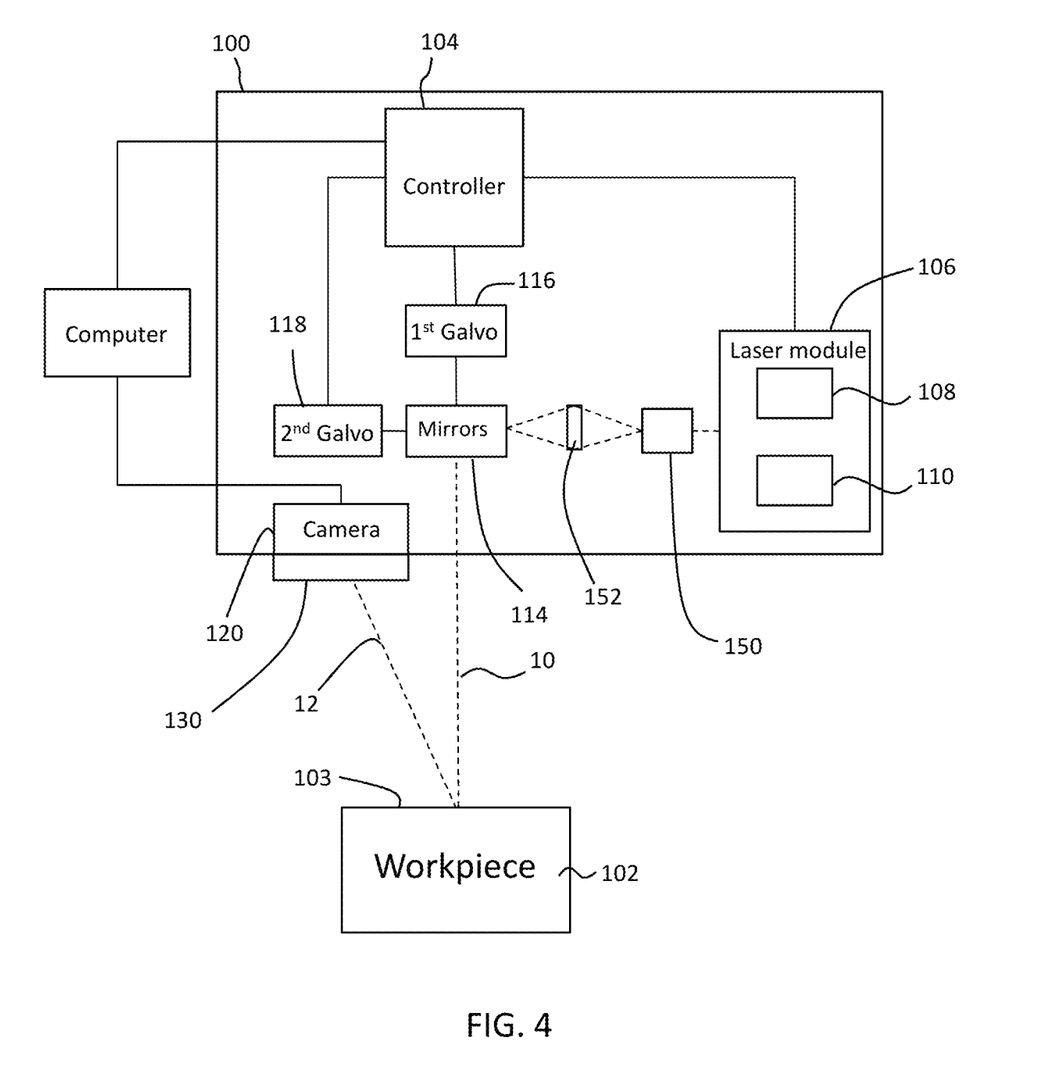
FIG. 4 is a schematic view of a laser marking system according to an embodiment.
Figure 5:
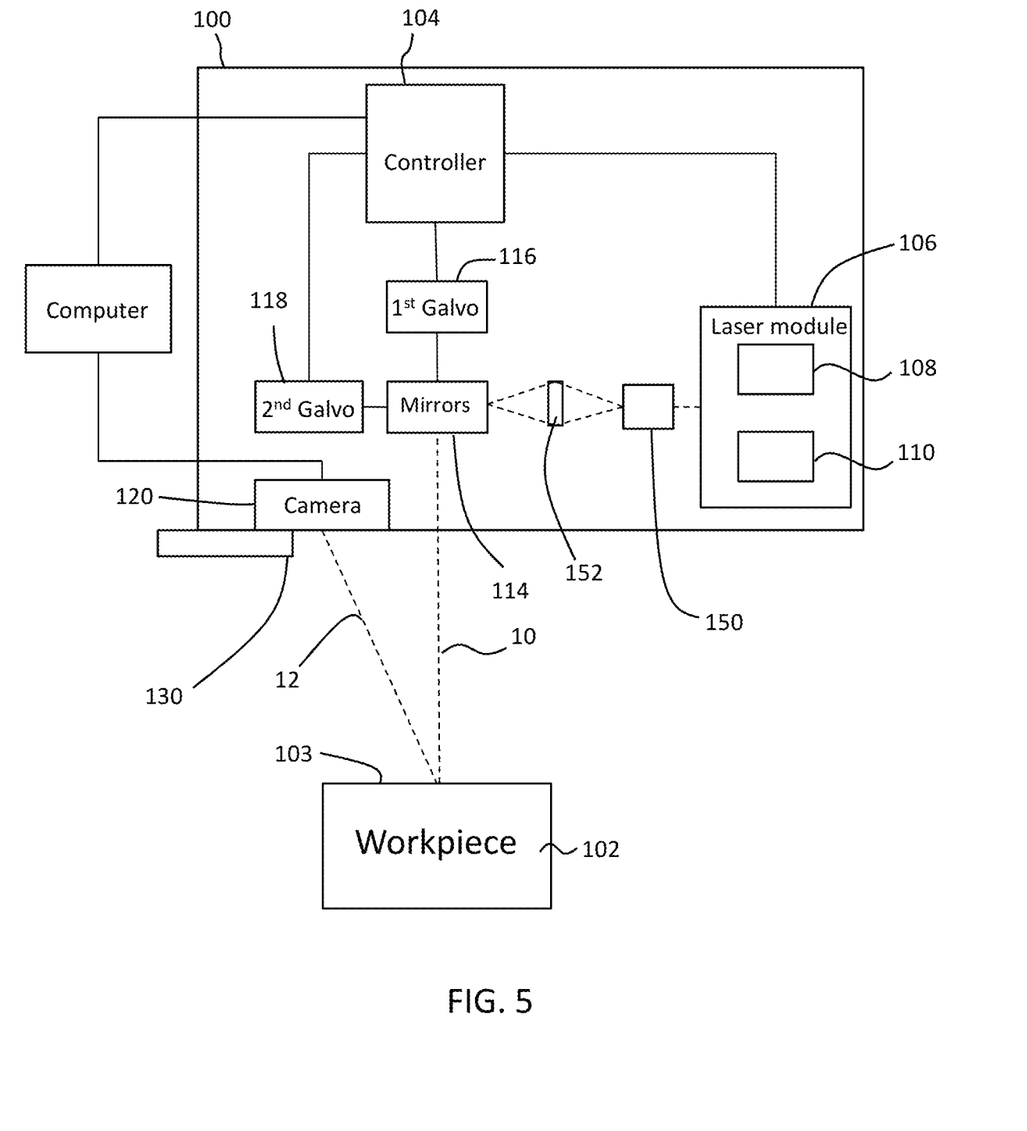
FIG. 5 is a schematic view of a laser marking system according to an embodiment.

Given the power levels that may be required in order to mark workpiece 102, it will be understood that the second laser light emitted by second laser light source 110 may, in some embodiments, cause issues with the sensors of camera 120. These issues may include, but are not limited to damaging the photodiodes or causing one or more calibration parameters to change, for example. Accordingly, FIGS. 4-5 show an exemplary embodiment of system 100 which includes a shutter 130. In FIG. 4, shutter 130 is in a closed position to prevent light from reaching camera 120. Vector controller 104 may control shutter 130 to move to the closed position when second laser light source 110 is active. In FIG. 5, shutter 130 is in an open position that allows light to reach camera 120. Vector controller 104 may control shutter 130 to move to the open position when second laser light source 110 is inactive and first laser light source 108 is active.

Figure 6:
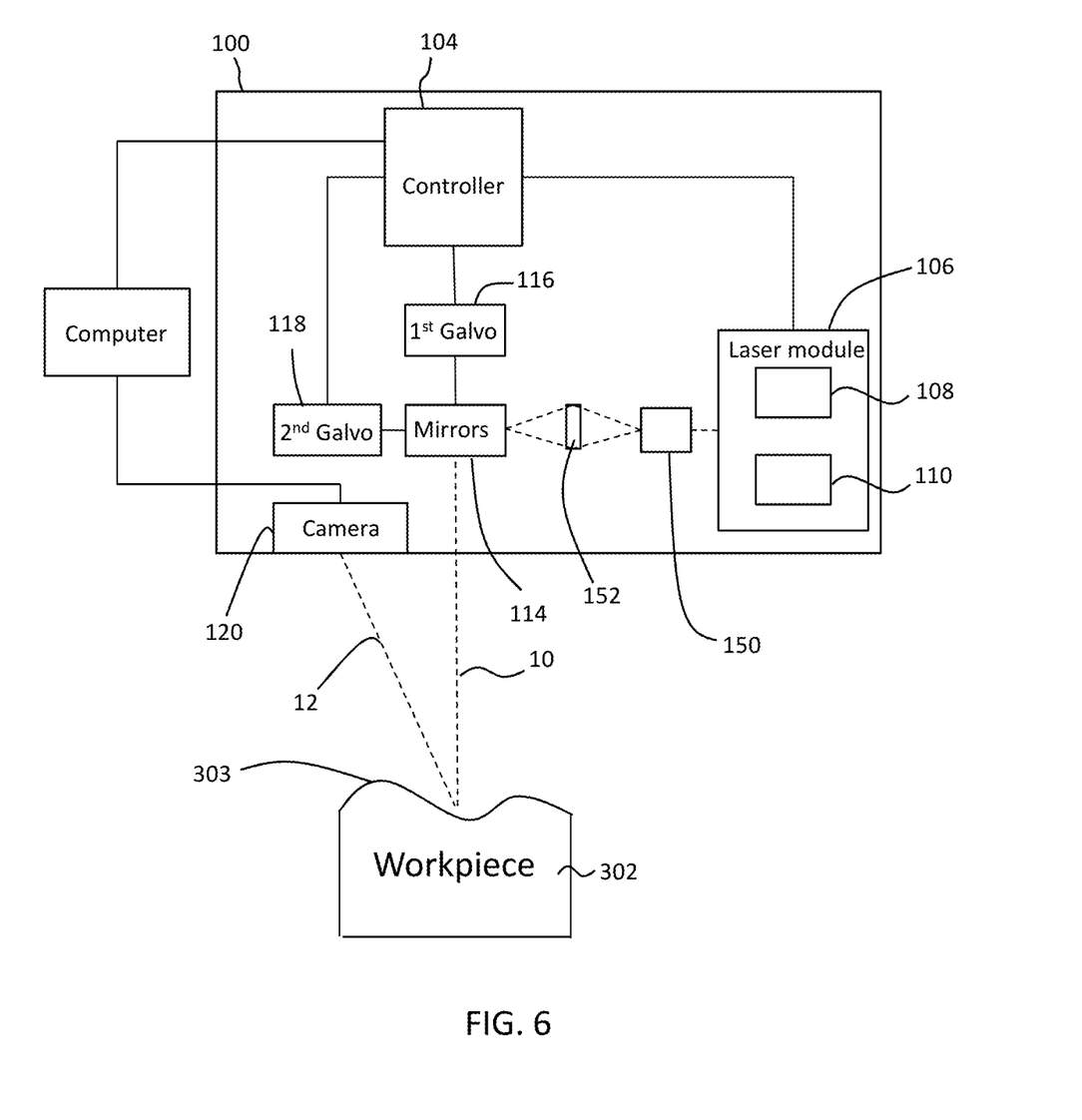
FIG. 6 is a schematic view of a laser marking system according to an embodiment.

FIG. 6 shows another exemplary embodiment in which workpiece 302 has an uneven marking surface 303. If marking surface 303 is uneven, the second laser light may become slightly unfocused as it moves along marking surface 303 to create the predetermined pattern. Therefore, the markings of the predetermined pattern may become distorted or less sharp due to variations in marking surface 303. In order to account for this, vector controller 104 may control first laser light source 108, first galvanometer 116, and second galvanometer 118 to scan the first laser light across marking surface 303. Camera 120 may be used to capture a preliminary image from this scan that includes preliminary three-dimensional coordinates of marking surface 303. Thus, when first laser light source 108 is activated to mark the predetermined pattern, vector controller 104 can use the preliminary three-dimensional coordinates of marking surface 303 to calculate necessary adjustments to the focal distance of the second laser light to insure a consistent size beam incident on marking surface 303. Since the relative geometries of the light source 110 and the camera 120 are known and fixed during operation, the three dimensional coordinates of the marking surface 303 may be determined using trigonometric principles. Vector controller 104 can then control dynamic focus linear lens translator 150 and objective lens 152 to adjust the focal distance of the first laser light as necessary.

Figure 7:
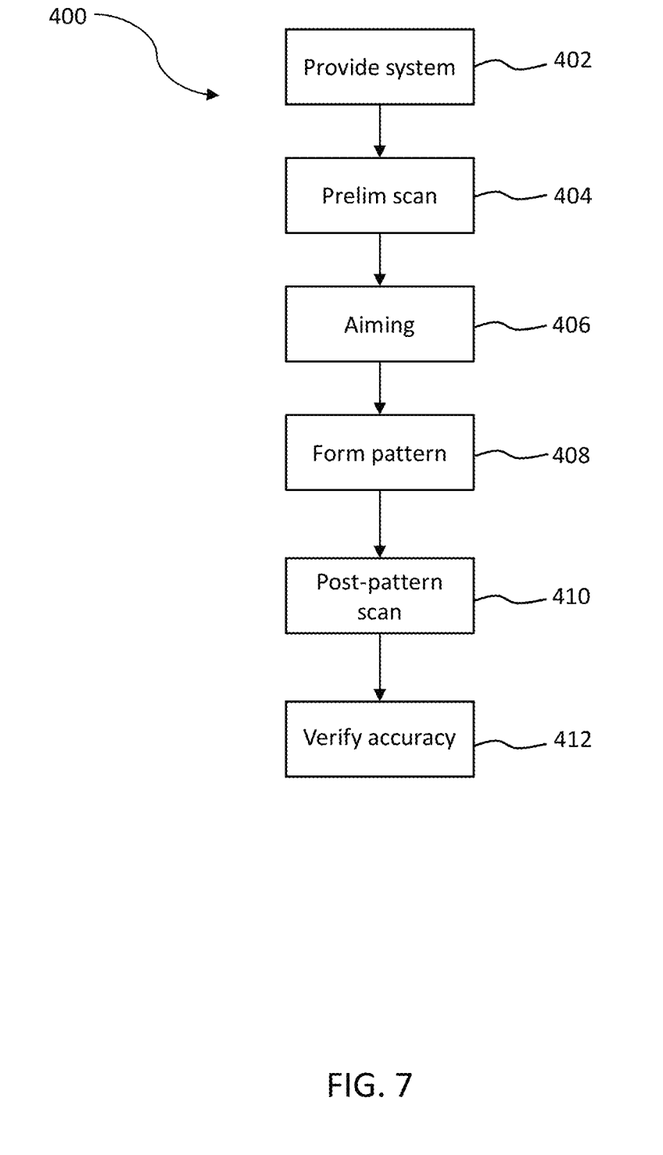
FIG. 7 is a flow diagram of a method of laser marking according to an embodiment.

FIG. 7 shows an exemplary embodiment of a method 400 for making a predetermined pattern on a workpiece. In block 402, a system such as system 100 is provided. As discussed with reference to FIG. 1, system 100 may include controller 104, a laser light module 106, dynamic focus linear lens translator 150 and objective lens 152, beam steering optics such as a mirror 114 controlled by a first galvanometer 116 and second galvanometer 118, and one or more cameras 120.

Referring again to FIG. 7, in block 404, a preliminary scan is performed. The preliminary scan may include emitting the first laser light at the marking surface 103 of workpiece 102; and recording, with camera 120, a preliminary image of the second light on the marking surface 103 and determining preliminary three-dimensional coordinates of the marking surface 103.

In block 406, an aiming or target laser, such as first laser light source 108 in an exemplary embodiment, is aimed at the marking surface 103 to generate an aiming pattern indicating where the predetermined pattern is to be formed. In block 408, second laser light emitted by second laser light source 110 is aimed to form the predetermined pattern. Additionally, focal distance of the first laser light may be controlled based on the preliminary three-dimensional coordinates acquired in block 404. In block 410, a post-pattern formation scan is performed by emitting first light onto the marking surface and recording an image with camera 120. Based on the image and coordinates from the vector controller at each point measured, three dimensional coordinates of the marking surface may be determined. It should be appreciated that the scanning of the work surface may include moving the first light on the work surface and acquiring a plurality of images. In block 412, the three-dimensional coordinates and the image acquired in block 410 is used to verify accuracy and quality of the formation of the predetermined pattern.

Figure 8:
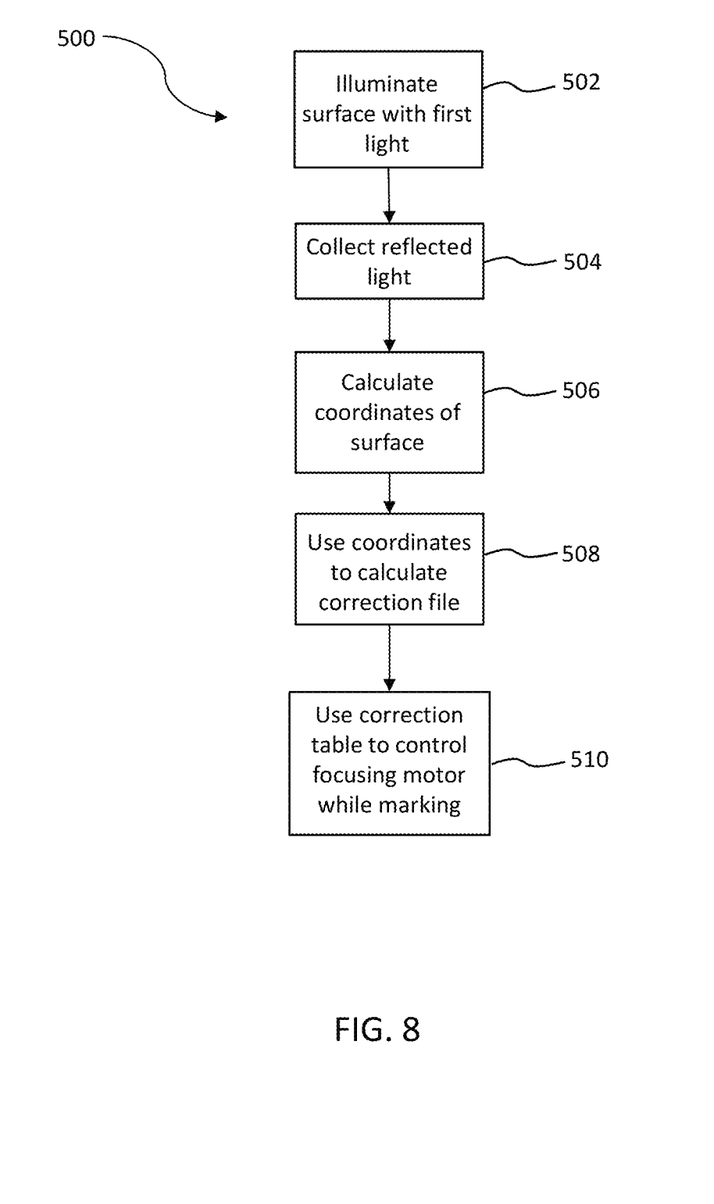
FIG. 8 is a flow diagram of a method of laser marking according to an embodiment.

FIG. 8 shows an exemplary embodiment of a method for controlling laser marking with a second laser light source based on an optical correction file generated using a first laser light source. In block 502, vector controller 104 energizes first laser light source 108 and controls first galvanometer 116 and second galvanometer 118 to illuminate a workpiece surface such as marking surface 103 or marking surface 303. In block 504, one or more cameras sensitive to the first laser light, such as camera 120, are used to collect reflected light positions from the workpiece surface. In block 506, computer 160 uses position data from vector controller 104 and the reflected light data to calculate the position and height of the workpiece in real time. In block 508, vector controller 104 uses the data collected by camera 120 to generate a 3D optical correction file specific to the workpiece measured. In block 510, vector controller 104 uses the optical correct file to control beam shaping optics such as focus linear lens translator 150 and/or objective lens 152 to maintain focus on the random shaped workpiece as laser power is applied to the system.

The features of the embodiments described above are important and non-trivial because they result in significant advantages. For example, overall, the combination of the laser marking hardware and the laser line probe hardware into a single system significantly simplifies the laser marking process. In the embodiments described above, preliminary scanning, laser marking, and post-marking verification can all take place in the same system without moving the system or the workpiece. This eliminates the possibility of errors caused by slight misalignment of coordinate systems when moving the workpiece between devices. The efficiency of the process is also greatly improved by eliminating the need to relocate the workpiece. Additionally, the embodiments described above are robust with regard to workpiece material and type of laser marking being done. For example, the laser line probe hardware is capable of detecting both three-dimensional coordinates and color image data. Thus, the system is able to perform verification of both physical laser marking and color-change laser marking. Additionally, variations in the surface of a workpiece may result in inaccurate or poor quality marking. The embodiments described above allow for accurate measurement of the surface of the workpiece on the same system performing the marking. Thus, a focal distance of the marking laser light can be adjusted to account for the variations in the marking surface, thereby improving accuracy and quality of the laser marking.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A laser marking system for marking a predetermined pattern on a workpiece, the laser marking system comprising:
   a first light source structured to emit first light at a first wavelength;
   a second light source structured to emit second light at a second wavelength different from the first wavelength and selected to mark a marking surface of the workpiece;
   beam shaping optics structured to adjust a focal length of the second light;
   beam steering optics structured to aim the first laser light and the second laser light;
   a controller configured to:
      control the first light source to emit the first light at the marking surface of the workpiece; and
      control the beam steering optics to aim the second light so as to mark the marking surface of the workpiece and create the predetermined pattern;
   a camera structured to detect first light reflected from the marking surface of the workpiece and record an image;
   wherein the laser marking system is configured to verify the creation of the predetermined pattern based on the recorded image.

2. The laser marking system of claim 1, wherein the first light source is a first laser light source;
   the first light is first laser light;
   the controller is further configured to control the beam steering optics to aim the first laser light over the marking area of the predetermined pattern.

3. The laser marking system of claim 2, wherein first laser light is visible laser light, and
   the controller is further configured to, prior to marking the marking surface of the workpiece, control the beam steering optics to aim the first laser light at the marking surface to indicate a positioning of the predetermined pattern.

4. The laser marking system of claim 1, further comprising a shutter structured to alternate between a closed position in which the shutter blocks light from reaching the camera and an open position in which light is allowed to reach the camera;
   Wherein the controller is structured to control the shutter such that the shutter is in the closed position when the second light source is operated.

5. The laser marking system of claim 1, further comprising a processor;
   wherein the controller is further configured to control the beam steering optics to aim the first laser light over the marking area of the predetermined pattern;
   the camera is configured to collect reflected first laser light from the workpiece;
   the processor is configured to use position data from the controller and reflected light data from the computer to calculate coordinates of a workpiece surface;
   the controller is configured to generate a three-dimensional (3D) optical correction file based on the coordinates of the workpiece surface; and
   the controller is configured to, while operating the second light source, control the beam shaping optics based on the optical correction file to maintain focus of the second light on the workpiece surface.

6. The laser marking system of claim 1, wherein the beam steering optics comprises mirrors, a first galvanometer, and a second galvanometer, the first galvanometer and second galvanometer being operably coupled to the mirrors so as to control an aiming direction of the mirror.

7. The laser marking system of claim 1, wherein the beam shaping optics comprises a dynamic focus linear lens translator and objective lens.

* * * * *